(12) United States Patent
Colbourne et al.

(10) Patent No.: US 6,654,564 B1
(45) Date of Patent: Nov. 25, 2003

(54) TUNABLE DISPERSION COMPENSATOR

(75) Inventors: Paul Colbourne, Nepean (CA); Xiaoli Fu, Nepean (CA)

(73) Assignee: JDS Uniphase Inc., Ottawa (CA)

( * ) Notice: Subject to any disclaimer, the term of this patent is extended or adjusted under 35 U.S.C. 154(b) by 605 days.

(21) Appl. No.: 09/634,707

(22) Filed: Aug. 7, 2000

Related U.S. Application Data

(63) Continuation-in-part of application No. 09/434,376, filed on Nov. 5, 1999.

(51) Int. Cl.[7] .............................................. H04B 10/00
(52) U.S. Cl. ...................... 398/147; 398/142; 398/148; 398/149; 398/158; 398/159
(58) Field of Search .................................. 359/161, 577, 359/159, 173; 398/142, 147, 148, 149, 158, 159

(56) References Cited

U.S. PATENT DOCUMENTS

| | | | | |
|---|---|---|---|---|
| 5,557,468 A | * | 9/1996 | Ip | .............................. 395/615 |
| 6,081,379 A | | 6/2000 | Austin et al. | ............... 359/584 |
| 6,125,220 A | * | 9/2000 | Copner et al. | ................. 385/27 |
| 6,208,444 B1 | * | 3/2001 | Wong et al. | .................... 398/9 |
| 6,222,958 B1 | * | 4/2001 | Paiam | ........................ 385/24 |
| 6,252,716 B1 | * | 6/2001 | Paiam | ........................ 359/618 |

FOREIGN PATENT DOCUMENTS

| | | | |
|---|---|---|---|
| EP | 0 426 357 A2 | 5/1991 | ............ H04B/10/18 |
| EP | 0 629 896 A2 | 12/1994 | ............ G02F/1/225 |
| EP | 0 917 312 A2 | 5/1999 | ............ H04B/10/18 |
| EP | 0 930 741 A2 | 7/1999 | ............ H04J/14/02 |
| WO | 99 43118 | 8/1999 | ............ H04J/14/02 |

OTHER PUBLICATIONS

European Search Report EP 00 81 1023 Feb. 26, 2001.

\* cited by examiner

*Primary Examiner*—Leslie Pascal
*Assistant Examiner*—Dzung Tran
(74) *Attorney, Agent, or Firm*—Teitelbaum & MacLean; Neil Teitelbaum; Doug MacLean

(57) ABSTRACT

A method and device is disclosed for dispersion compensation of an optical signal. By providing two filters having a sloped dispersion and opposite in sign over a wavelength band wherein one filter is tunable, a controllable amount of dispersion can be introduced to offset or compensate dispersion. Preferably one of the filters is a tunable periodic device in the form of a multi-cavity GT etalon. In a preferred embodiment of the filters can be designed to provide various controllable but different constant amounts of dispersion.

19 Claims, 11 Drawing Sheets

TUNABLE DISPERSION COMPENSATOR

This is a continuation-in-part application of U.S. patent application Ser. No. 09/434,376, filed Nov. 5, 1999.

FIELD OF THE INVENTION

This invention relates generally to a device for compensation of chromatic dispersion in optical fiber communication systems.

With increased demand being placed on existing optical fiber facilities, lightwave communications providers are looking for ways to increase the usable bandwidth available for customers from existing fiber without installing additional fibers. Lightwave communication systems depend on optical fiber to transport the lightwave signals from one location to another in the system.

Optical fiber, both single mode and multimode, has modal and chromatic dispersion parameters which result from material and waveguide characteristics of the fiber. Chromatic dispersion causes lightwaves at one wavelength to travel at a different velocity through the optical fiber than lightwaves at another wavelength. Thus, for example, a short pulse input to one end of the fiber emerges from the far end as a broader pulse. Pulse broadening effects and, therefore, dispersion limit the rate at which information can be carried through an optical fiber.

Several solutions have been proposed to avoid or at least mitigate the effects of dispersion. These solutions include dispersion compensation techniques.

Most high-speed fiber optic communication systems today use externally modulated lasers to minimize laser 'chirp' and reduce the effects of chromatic dispersion in the fiber. Even with external modulation, there is a certain amount of 'chirp' or broadening of the laser spectrum, because any modulated signal must contain frequency 'sidebands' which are roughly as wide as the modulation rate. Higher bit rate transmission systems consequently have broader frequency sidebands, and at the same time can tolerate less phase delay because of the shorter bit period. Next-generation high bit rate systems are consequently very sensitive to chromatic dispersion of the optical fiber and any components such as WDM's within the system.

Chromatic dispersion of optical fiber is roughly constant over the 1550 nm communication window, and can be compensated by several techniques including dispersion compensating fiber, FBG's, etc. However, certain wavelength filtering components such as WDM's can have significant dispersion characteristics due to a fundamental Kramers-Kronig type relationship between transmission spectrum and dispersion characteristics. This type of dispersion characteristic typically varies substantially over the narrow WDM passband, and therefore is difficult to compensate using conventional techniques such as dispersion compensating fiber. It is one objective of the present invention to compensate for the dispersion from WDM devices, including multiplexers, demultiplexers, and interleavers.

Conventional optical communication systems are known to utilize directly modulated semiconductor lasers. In combination with chromatic dispersion characteristics of single-mode optical fiber, chirping of these lasers contributes to the spread of optical pulses and results in intersymbol interference and overall degradation in transmission. Current and "next-generation" high speed systems employ transmitters which use narrow linewidth lasers and external modulators in a window or range of wavelengths about 1550 nm. These external modulators generally have a very low chirp; some designs have a zero or negatively compensating chirp. Nevertheless, transmission distance is still dispersion-limited to about 80 kilometers at transmission rates of 10 Gb/s using conventional single mode fibers.

One solution to this problem is in the use of dispersion shifted fiber which has little dispersion in the 1550 nm window. However, replacing existing fiber with dispersion shifted fiber is costly. Other approaches have been proposed such as optical pulse shaping to reduce laser chirp, using a semiconductor laser amplifier to impose a chirp on the transmitted signal that counteracts the chirping of the directly modulated semiconductor laser.

Approaches that are more consistent with the teachings of this invention attempt to reduce the intersymbol interference at or near the receiver, or intermediate the transmitter and the receiver. Essentially any medium capable of providing a sufficient dispersion opposite to that of the optical fiber can serve as an optical pulse equalizer. For example it is known to use a special optical fiber having an equal chromatic dispersion at a required operating wavelength but opposite in sign to that of the transmitting fiber. Other methods include the use of fiber Bragg gratings as disclosed in U.S. Pat. No. 5,909,295 in the name of Li et al., and disclosed by Shigematsu et al., in U.S. Pat. No. 5,701,188 assigned to Sumitomo Electric Industries, Ltd., and the use of planar lightwave circuit (PLC) delay equalizers. Unfortunately, special compensating fiber has a high insertion loss and in many applications is not a preferable choice. Fiber gratings are generally not preferred for some field applications due to their narrow bandwidth, and fixed wavelength. PLCs are also narrow band, although tunable devices; fabricating a PLC with large dispersion equalization remains to be difficult. Shigematsu et al. disclose a hybrid of both of these less preferred choices; dispersion compensating fibre with chirped Bragg gratings.

The exact amount of dispersion compensation required for a particular installed fiber link may not be known, and may vary with wavelength or environmental conditions such as temperature. Therefore, it is desirable to have a device capable of providing a tunable amount of dispersion compensation, to simplify installation and to provide real-time control of dispersion.

In a paper entitled "Optical Equalization to Combat the Effects of Laser Chirp and Fiber Dispersion" published in the Journal of Lightwave Technology. Vol. 8, No. 5, May 1990, Cimini L. J. et al. describe an optical equalizer capable of combating the effects of laser chirp and fiber chromatic dispersion on high-speed long-haul fiber-optic communications links at 1.55 $\mu$m. Also discussed is a control scheme for adaptively positioning the equalizer response frequency. Cimini et al. describe a device having only one common input/output port at a first partially reflective mirror and a second 100% reflective mirror together forming a cavity. The control scheme described attempts to track signal wavelength by obtaining feedback from a receiver. The amplitude response of the equalizer is essentially flat with wavelength at the input/output port, and thus, the proposed control scheme is somewhat complex requiring processing of high speed data at the optical receiver. As well, the proposed control method is stated to function with RZ signals but not with NRZ signals, a more commonly used data format. Although the equalizer described by Cimini et al. appears to perform its intended basic dispersion compensating function, there exists a need for an improved method of control of the position of the equalizer frequency response, and as well, there exists a need for an equalizer that will provide a sufficient time shift over a broader range of wavelengths. U.S. Pat. No. 5,023,947 in the name of Cimini et al., further describes this device.

A Fabry-Perot etalon having one substantially fully reflective end face and a partially reflective front face is known as a Gires-Tournois (GT) etalon. In a paper entitled Multifunction optical filter with a Michelson-Gires-Turnois interferometer for wavelength-division-multiplexed network system applications, by Benjamin B. Dingle and Masayuki Izutsu published 1998, by the Optical Society of America, a device is described which is hereafter termed the MGT device.

U.S. Pat. No. 5,557,468 in the name of Ip assigned to JDS Fitel Inc, of Nepean Canada issued Sep. 17, 1996 and shows a dual GT etalon dispersion compensator. This '468 patent states that cascading two filters having the same reflectivity on the input/output mirrors has been suggested, but does not produce optimum results with respect to increasing the wavelength region over which the equalizer operates; The Ip patent illustrates that by cascading the etalon 100 shown in FIG. 2 with another etalon having dissimilar reflectivity characteristics and being slightly offset in its center frequency response, it is possible to favourably extend the range of the output response of the filter considerably, with respect to both time delay and in operating wavelengths. An etalon equalizer 160 in having two dissimilar cascaded etalons 162 and 164 is shown in FIG. 6 of Ip. The output response for each of the etalons 162 and 164 and the output response for the cascaded equalizer 160 is shown in FIG. 7 in the Ip patent. By cascading the etalons, the operating wavelength is doubled from 5 to 10 Ghz and the time delay is increased by about 25 percent. The first stage etalon (cavity) 162 has a first mirror with a reflectivity $R_1=55\%$ serving as an input/output port; the second stage etalon (cavity) 164 has a first mirror with a reflectivity $R_2=38\%$. The nominal distance "d" between first and second mirrors in each cavity is 2 mm. As is shown in FIG. 7, the offset of the center operating wavelength of each of the cavities is approximately 5 Ghz which corresponds to a small difference in cavity spacing ($d_1 \neq d_2$). Although Ip's two etalons achieve their intended purpose of extending the operation wavelength range, it would be advantageous to have a device that provide a controllable constant amount of dispersion within a wavelength band of interest. That is, where tuning allowed different constant amounts of dispersion to be induced.

The MGT device as exemplified in FIG. 1 serves as a narrow band wavelength demultiplexor; this device relies on interfering a reflected E-field with an E-field reflected by a plane mirror 16. The etalon 10 used has a 99.9% reflective back reflector 12$r$ and a front reflector 12$f$ having a reflectivity of about 10%; hence an output signal from only the front reflector 12$f$ is utilized.

As of late, interleaving/de-interleaving circuits are being used more widely. These specialized multiplexor/demultiplexors serve the function of interleaving channels such that two data streams, for example a first stream consisting of channel 1, 3, 5, 7, and so on, is interleaved, or multiplexed with a second stream of channels, 2, 4, 6, 8, and so on, for form single signal consisting of channels 1, 2, 3, 4, 5, 6, 7, 8, and so on. Of course the circuit can be used oppositely, to de-interleave an already interleaved signal, into plural de-interleaved streams of channels. One such interleaver circuit is described in U.S. Pat. No. 6,125,220 issued Sep. 26, 2000 in the name of Copner et al., and another is in U.S. Pat. No. 6,040,932 issued Mar. 21, 2000 in the name of Colbourne et. al. Although interleaver circuits perform a desired function, it has been discovered that some of these circuits suffer from unwanted periodic chromatic dispersion within each channel. It is this type of periodic dispersion that can be obviated or lessened by the instant invention. It should also be noted that in many instances it is not desirable to completely eliminate all chromatic dispersion; it is believed that a small amount of such dispersion can be useful in reducing non-linear effects in WDM systems; therefore, the instant invention can be used to lessen dispersion by a required amount.

Hence, it is an object of this invention to overcome some of the limitations of the prior art described above. Furthermore, it is an object of the invention to provide a passive device that will compensate for or lessen dispersion over a plurality of interspaced wavelength channels simultaneously.

It is another object of this invention to provide a dispersion compensator that will provide a certain amount of dispersion over a predetermined wavelength band.

It is another object of the invention to provide a dispersion compensator that will provide a tunable dispersion compensator that is at least tunable over a certain range of wavelengths.

It is another object of this invention to provide a device and method for providing a tunably compensating for dispersion by provide a dispersion compensation device that provides different constant amounts of dispersion over a wavelength band of interest wherein the different amounts can be controlled by tuning the device.

SUMMARY OF THE INVENTION

In accordance with the invention a dispersion compensation device is provided for compensating dispersion in an optical signal in at least a predetermined wavelength band of wavelengths, comprising:
    a first GT resonator having a first FSR and a single sloped dispersion curve in the predetermined wavelength band;
    a second GT resonator having a single sloped dispersion curve in the predetermined wavelength band, the slope of the dispersion curve of the second GT resonator is opposite in sign to the slope of the dispersion curve of the first GT resonator in said wavelength band, the second GT resonator being optically coupled with the first GT resonator such that light launched into the first GT resonator is directed to the second GT resonator, at least one of the first GT resonator and the second GT resonator being a tunable resonator such that the free spectral range (FSR) thereof is controllably variable; and,
    a controller for controlling the FSR of each tunable resonator and for controlling the amount of dispersion within the wavelength band.

In accordance with the invention there is further provided a dispersion compensation device comprising two etalons and a controller. At least one of the etalons is a multi-cavity etalon, and at least one of the etalons being tunable such that its FSR can be controllably varied. The controllers are for controlling the optical path length of the tunable etalons. The device is tunable so as to provide more or less dispersion over an optical channel, by varying the optical path length of at least one of the tunable etalons.

In accordance with the invention there is provided a dispersion compensation device for compensating dispersion in an optical signal, comprising:
    a first optical filter having a monotonically increasing or decreasing sloped dispersion output response to light within at least a predetermined wavelength band; and a second optical filter having a monotonically oppositely sloped dispersion output response to light within a same predetermined wavelength band, the second optical filter being optically coupled with the first optical such that light launched into the first filter is directed to the second filter, at least one of the first optical filter and the second optical filter being a tunable filter to vary the dispersion thereof over the predetermined wavelength band, such that the dispersion of the device can be controllably varied.

In accordance with another aspect of the invention a method for compensating dispersion in an optical signal is provided, comprising the steps of:

providing a first optical filter having a monotonically sloped dispersion output response within at least a predetermined wavelength band;

providing a second optical filter having a monotonically sloped dispersion output response within at least a predetermined wavelength band, wherein the first and second filters have slopes of opposite sign;

tuning the first filter in a controllable manner to vary the amount of dispersion induced thereby within the predetermined wavelength band.

BRIEF DESCRIPTION OF THE DRAWINGS

Exemplary embodiments of the invention will now be described in conjunction with the drawings in which.

DETAILED DESCRIPTION

For the purposes of the present specification, the definition "single-slope" or "monotonic" denotes, in accordance with the Webster Ninth Collegiate Dictionary, functions that either never increase or never decrease as the independent variable increases. In other words, a first derivative of such a function would be either at least zero or at most zero. Monotonic functions may be stepped i.e. may have horizontal (flat) segments. However, in order to define unequivocally the wavelength position on the periodic output function, the horizontal, or flat, segment(s) should not be longer than a single period of the periodic function. The function should be continuous over the range of periods of interest of the periodic function.

Figure 1:
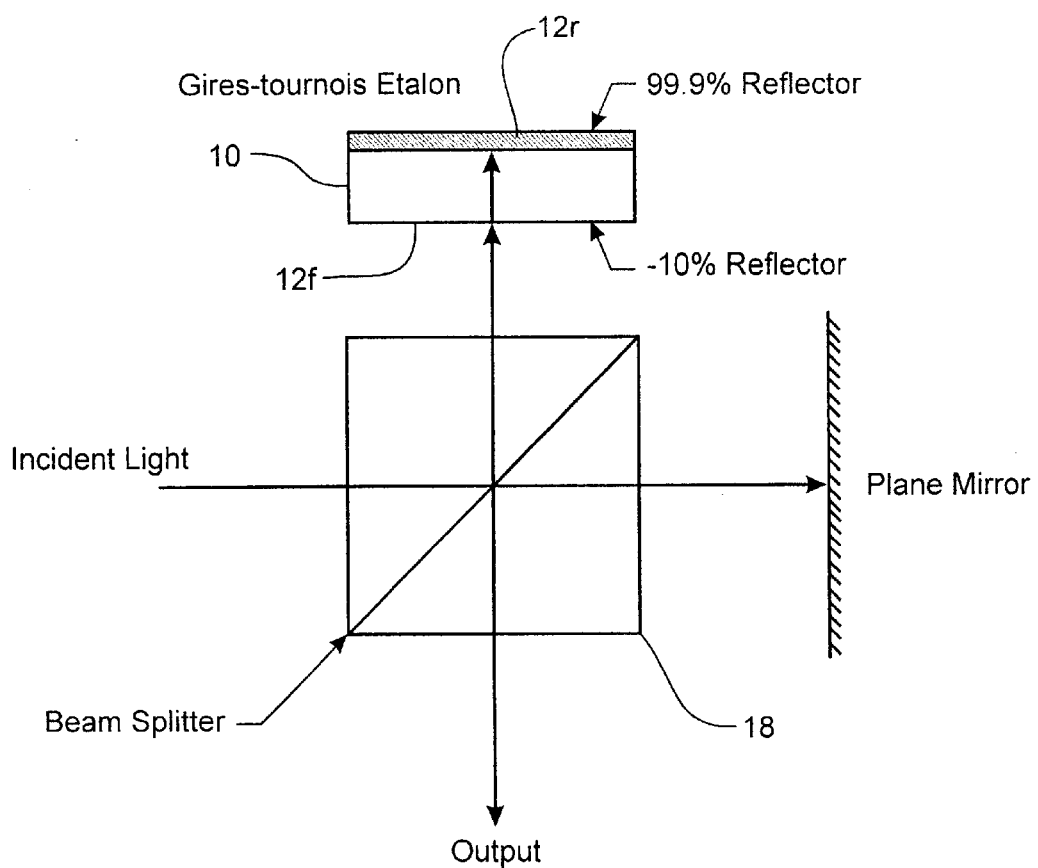
FIG. 1 is a circuit block diagram of a prior art Michelson-Gires-Tournois interferometer.
Figure 2:
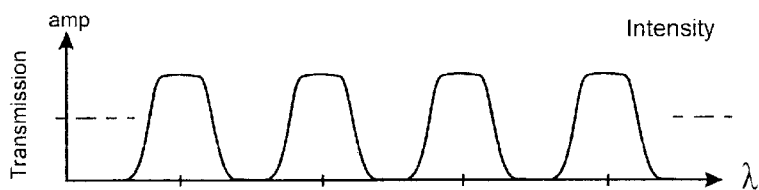
FIG. 2 is a graph of amplitude versus wavelength of output response of a de-interleaver device.
Figure 3:
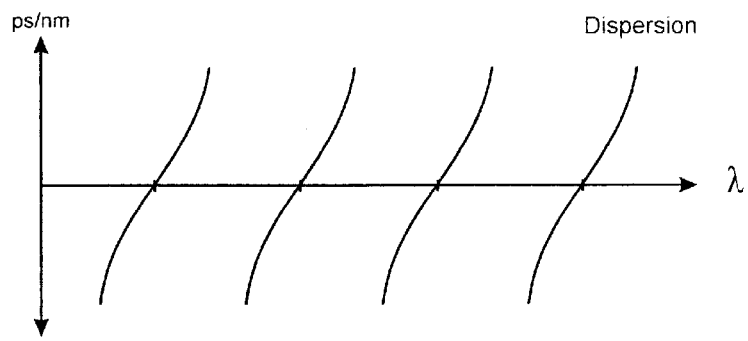
FIG. 3 is a graph of dispersion versus wavelength for the de-interleaver referenced in FIG. 2.

Turning now to FIG. 1, a block diagram of a prior art Michelson-Gires-Tournois interferometer is shown which serves as a narrow band wavelength demultiplexor/multiplexor in the form of an interleaver/de-interleaver circuit. As was described above, interleaver circuits often suffer from unwanted chromatic dispersion, which is repeated in adjacent channels in a multi-channel system. It is important to note that the dispersion within a channel, repeats itself within adjacent channels as will be seen from the following graphs. FIG. 2 illustrates the intensity response for an interleaver circuit wherein intensity is plotted against wavelength, assuming the interleaver is presented with light of equal intensity in the range of operation of the interleaver circuit. Referring now to FIG. 3, the dispersion of the interleaver plotted against wavelength is shown; the result is a periodic response illustrating that each narrow band channel suffers similarly. Thus the dispersion profile, in each channel is nearly identically repeated, rather than simply being a linear phenomenon across the range of wavelengths covering the channels of interest. Quite surprisingly, there is substantially no dispersion between centre wavelengths in adjacent channels; and, a conventional dispersion compensator would not provide the required compensation. Removing individual channels and providing dispersion compensation on each channel would be difficult, costly, and would introduce substantial unwanted loss into the system, as "n" dispersion compensators would be required to compensate "n" channels.

Figure 4:
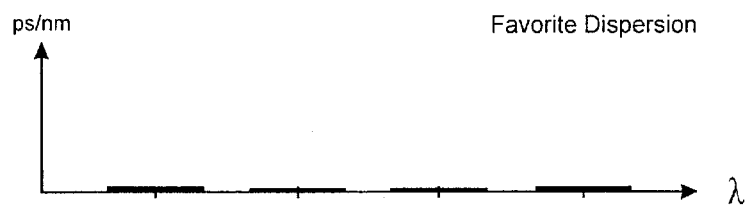
FIG. 4 is a graph of dispersion versus wavelength as a desired output response for dispersion related to the de-interleaver of FIG. 2.
Figure 13A:
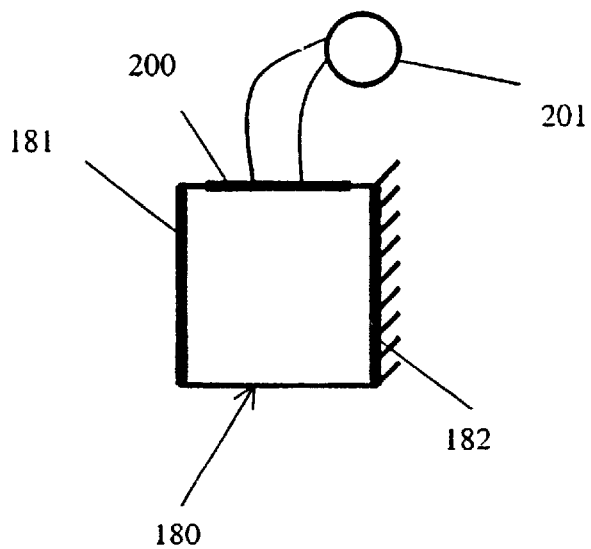
FIG. 13a is a side view of a 2 cavity GT etalon tuned to provide dispersion compensation for an output signal provided by an interleaver circuit.
Figure 13B:
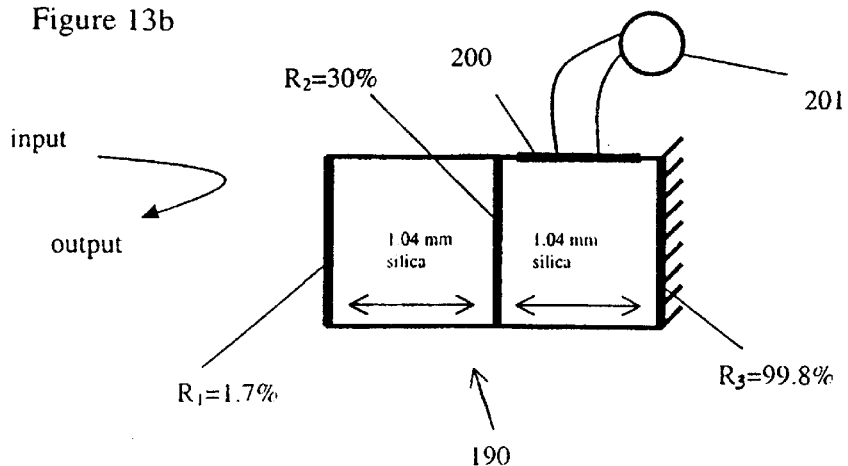
FIG. 13b is a side view of a single cavity GT etalon with a tunable resonant cavity.

In certain instances, it is desired to have some dispersion in each narrow band channel in a WDM system in order to suppress non-linear effects, which can introduce unwanted noise into the system. FIG. 4 illustrates a desired output response the dispersion compensator in accordance with this invention, wherein dispersion is plotted against wavelength. Thus, a device that will provide a periodic dispersion response that will substantially cancel the output response of FIG. 3 to result in the output response shown in FIG. 4 is required. The instant invention provides a device and method to achieve this end. FIG. 13b illustrates a two cavity GT etalon dispersion compensator having a free spectral range (FSR) of 100 GHz designed to compensate a signal with channels of width 0.2 nm separated by 100 GHz (about 0.8 nm). The FSR of the GT etalon should be matched to the channel width/spacing by properly selecting the cavity spacing, according to the formula $$d=c/(2*n*FSR)$$

where d is the cavity spacing, c is the speed of light, n is refractive index of the material forming the etalon cavity, and FSR is the free spectral range of the etalon, expressed in frequency units.

Figure 5:
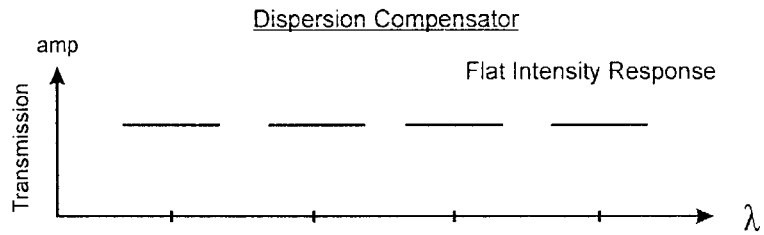
FIG. 5 is a graph of amplitude versus wavelength of an output response of a single cavity GT dispersion compensator in accordance with this invention.
Figure 6:
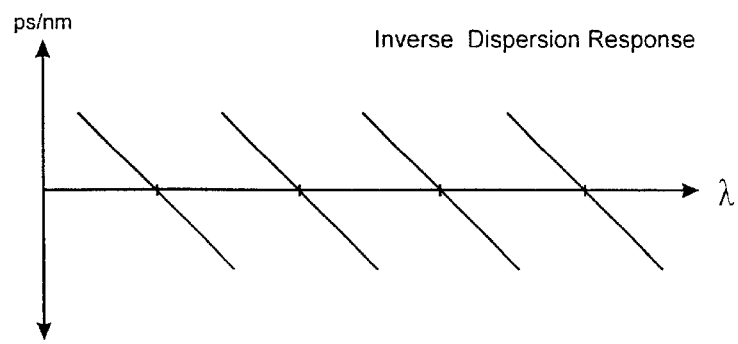
FIG. 6 is a graph of dispersion versus wavelength of an output response of the dispersion compensator in accordance with this invention.

The structure is similar to the Gires-Tournois interferometer described in a paper entitled 'Low-loss dispersion equalizer operable over the entire erbium window', D. Garthe, J. Ip, P. Colboume, R. E. Epworth, W. S. Lee and A Hadjifotiou, Electronics Letters vol. 32, no. 4, 15$^{th}$ February 1996, pp. 371–372, but with a multi-cavity structure to modify the dispersion characteristics as required. In FIG. 13 the etalon is shown to have a first reflective surface having a reflectivity R1, a second reflective surface having a reflectivity R2, and a third reflective surface having a reflectivity R3 which is essentially 100% reflective. R2 and R3 have reflectivities greater than 0 and less than 100%. The two gaps between the three surfaces have thickness d1 and d2 which are equal or integer multiples of one another so as to give a periodic response. A periodic response is desirable when multiple wavelengths periodically spaced must be compensated. FIGS. 5 and 6 illustrate output responses of intensity versus wavelength and dispersion versus wavelength as required, to achieve an overall output response in dispersion given the input signal shown in FIG. 2. Special attention must be paid to obtain precisely equal spacings between the mirror surfaces of the multi-cavity device, since the spacing must be equal within a small fraction of a wavelength. This can be achieved by, for example, polishing both mirror spacers at the same time, and joining the parts by optical contacting techniques; in this case the mirror coatings should be designed such that the reflection phases of the coatings are equal. Alternatively, the device may be actively aligned during assembly to obtain the correct spacing between the mirrors.

Figure 7:
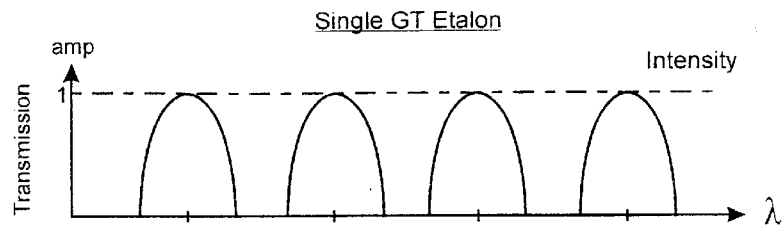
FIG. 7 is a graph of amplitude versus wavelength response for a white light input signal for a known single reflective/transmissive etalon illustrating the channels within the wavelength band of interest.
Figure 8:
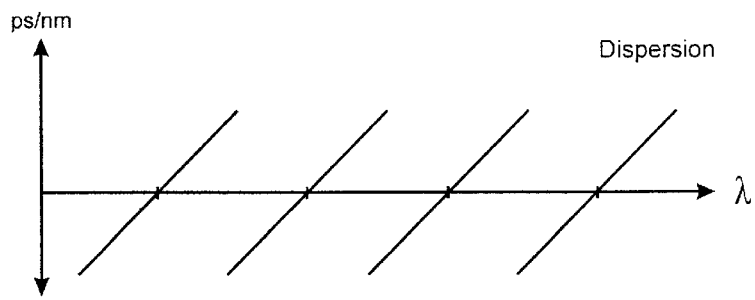
FIG. 8 is a graph of dispersion versus wavelength for the single etalon of FIG. 7.
Figure 9:
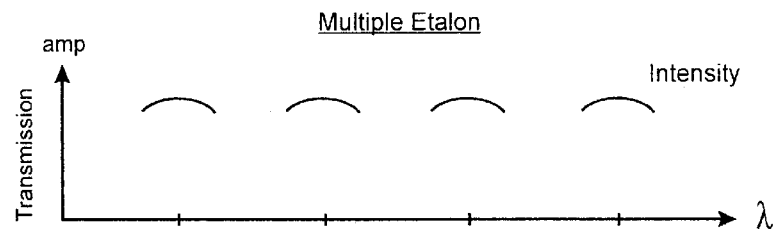
FIG. 9 is a a graph of more flat amplitude versus wavelength response for a white light input signal for a multiple etalon illustrating the channels within the wavelength band of interest.
Figure 10:
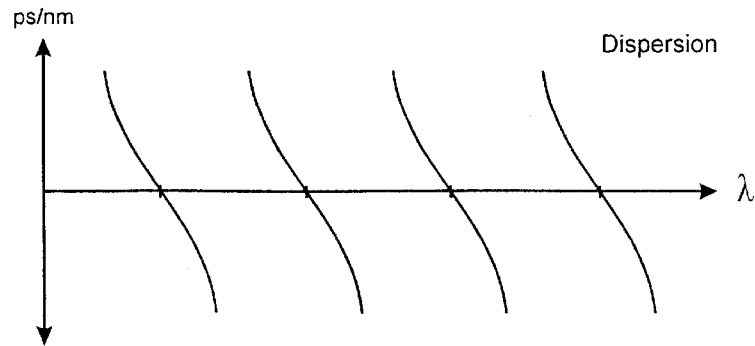
FIG. 10 is a graph of dispersion versus wavelength for the multiple etalon of FIG. 9.
Figure 11:
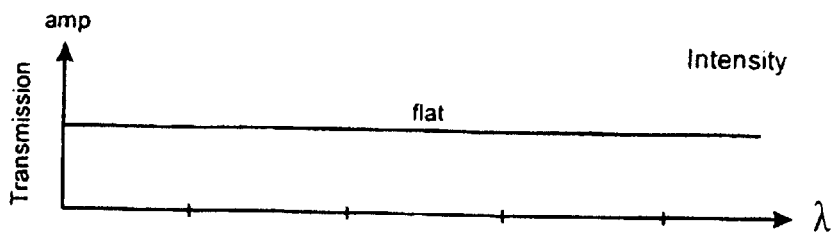
FIGS. 11 and 12 are graphs of intensity versus wavelength and dispersion versus wavelength for known prior art, non-periodic dispersion compensation means.
Figure 12:
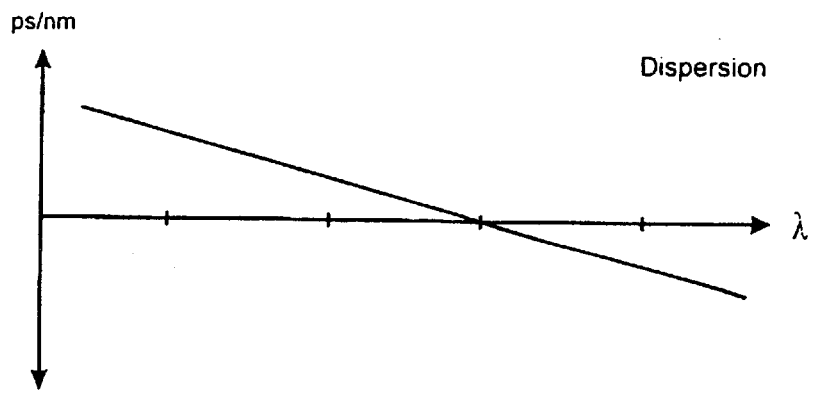

FIG. 5 indicates that a device having a substantially flat output response in intensity is required. Stated more simply, the intensity of the input signal should be constant after passing through the dispersion compensator. It is desired to have as little attenuation as possible. This response is characteristic of a GT etalon. Essentially all of the energy put in, is returned, yielding a nearly flat amplitude output response. The mirror reflectivities are 0.8%, 24%, and 99.8%. In practice the loss may vary by 0.1–0.3 dB over wavelength. A substantially inverse dispersion characteristic as shown in FIG. 6, to that shown in FIG. 3 is required in order to produce compensation. FIG. 7 illustrates the amplitude and dispersion characteristic of a single etalon that is both transmissive and reflective. It can be seen that the amplitude response is a series of peak at each center wavelength and FIG. 8 illustrates its dispersion characteristic. This periodic peaked amplitude response is not suitable. In contrast, the response shown in FIGS. 9 and 10 for a GT multiple etalon is preferred. The use of multiple etalons provides suitably wide bands or channels, having a substantially flat amplitude output response, and the dispersion characteristic shown in FIG. 10 is substantially opposite in slope to the dispersion of the input signal shown in FIG. 3., producing an overall dispersion as shown in FIG. 4. Of course, by varying the reflectivity of R1 and R2, tailored responses can be provided. Furthermore, additional cavities can be provided if required.

Figure 14:
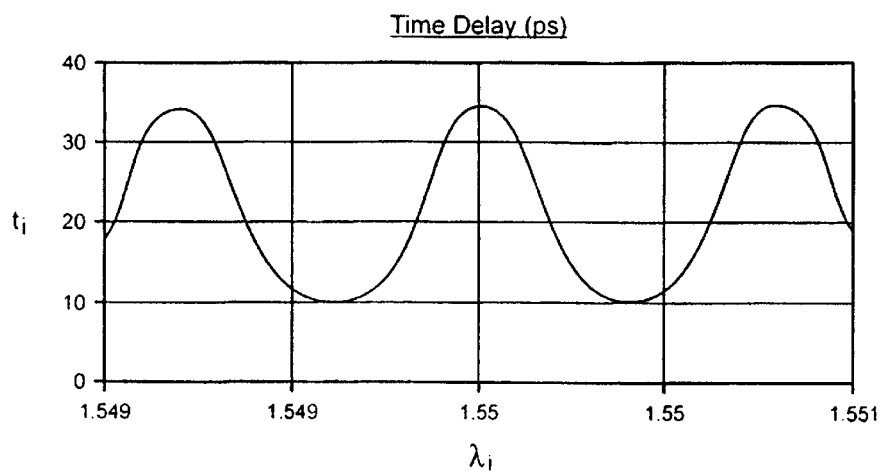
FIG. 14 is a plot of time delay versus wavelength for a dispersion compensator in accordance with an embodiment of this invention.
Figure 15:
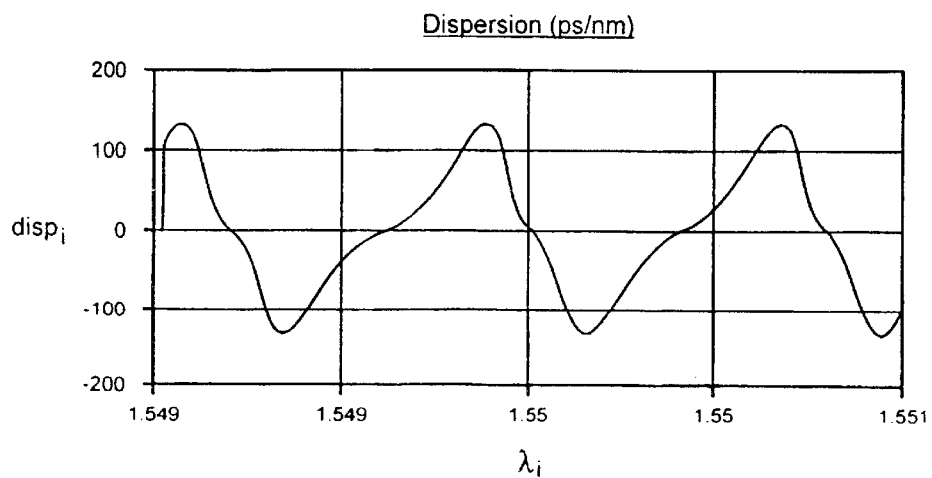
FIG. 15 is a graph which illustrates dispersion and its periodic nature for certain WDM devices.
Figure 18A:
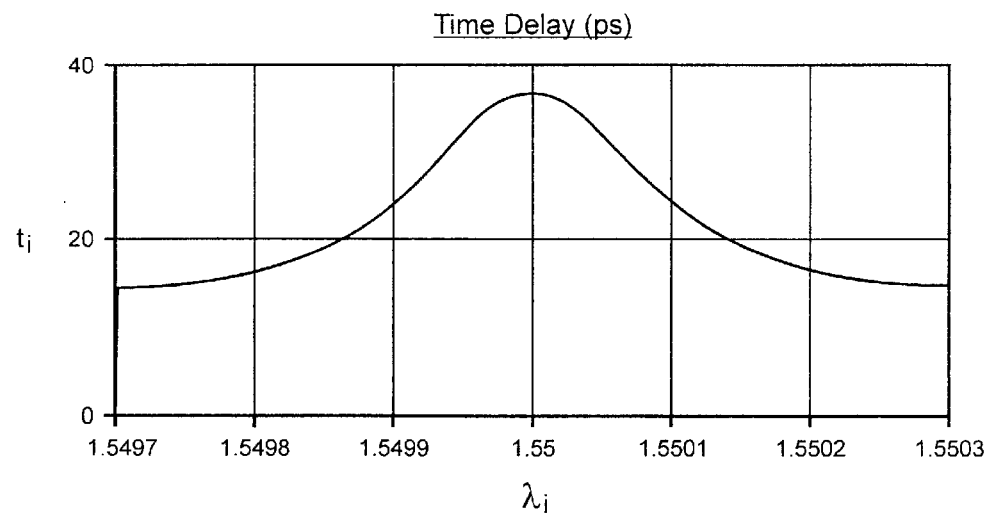
FIG. 18a and 18b are graphs of time delay in (ps) and dispersion in ps/nm respectively, for a single cavity GT dispersion compensator.
Figure 18B:
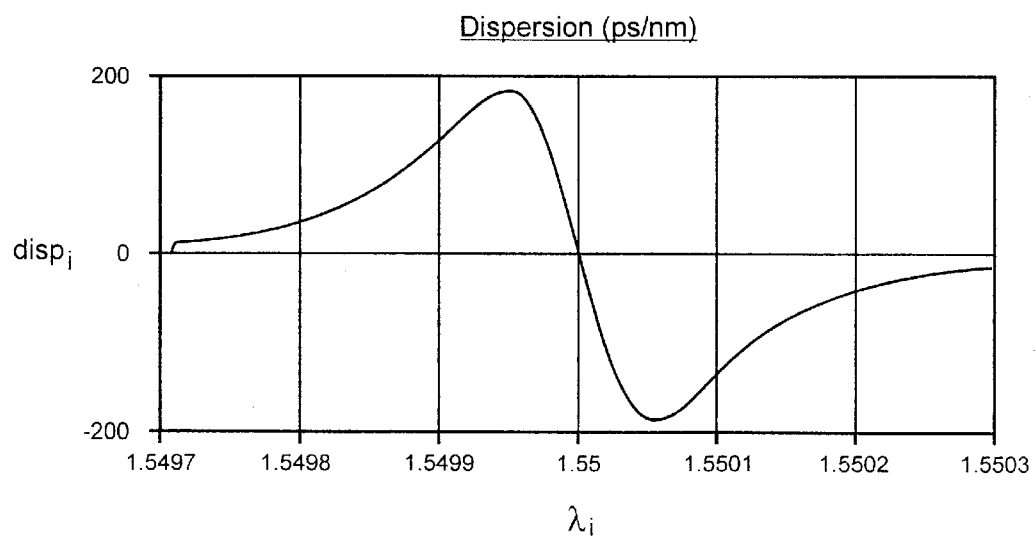

Turning now to FIG. 14, a plot is shown of a dual cavity dispersion compensator having a first cavity and GT cavity. The cavities are made of two blocks of silica providing a predetermined gap of 1.04 mm between reflective end faces. The device has a front input/output face having a reflectivity of 1.7%, an outward oppositely facing end face that is substantially totally reflective having a reflectivity of 99.8% and a second face having a reflectivity of 30% disposed between the front and outward facing end faces. The periodic nature of time delay versus wavelength is shown in FIG. 14. FIG. 15 illustrates dispersion, wherein the periodic nature of the dispersion is evident from the plot. By providing a dual cavity device a flatter top results in the time delay curve shown providing a closer fit to the delay characteristics of a typical device requiring compensation. In contrast and less preferred FIGS. 18a and 18b illustrate the dispersion characteristics of a single cavity GT compensator 180 (FIG. 13a) having reflectivities of 0.22 and 0.998 for the front and rear faces 181 and 182, respectively. The disadvantage of this device is that while suitable intensity response and dispersion slope can be obtained, the linear sloped region is not wide enough (in wavelength) to compensate the entire passband of the WDM device. The dual-cavity device shown in other embodiments enables a much wider channel to be compensated.

Figure 16A:
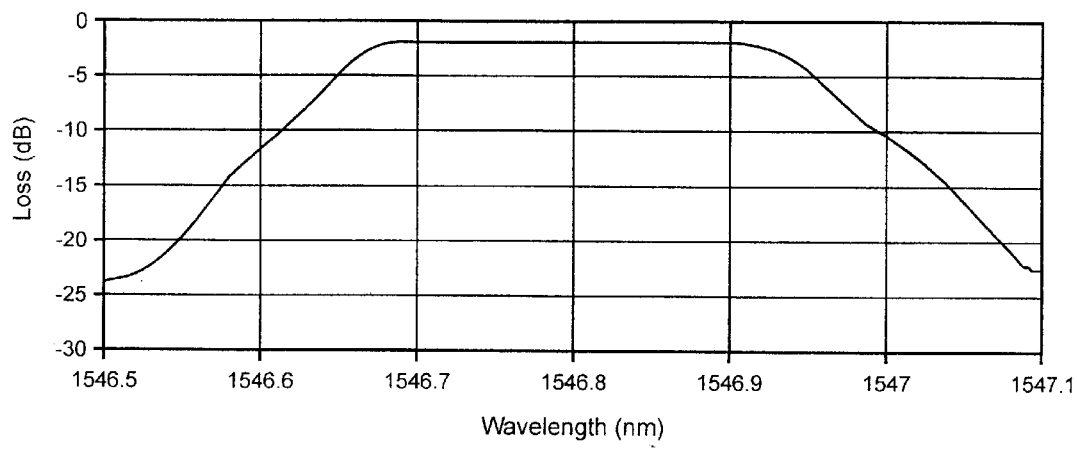
FIGS. 16a, 16b and 16c are graphs depicting the loss, group delay, and dispersion of a double WDM filter in the form of a double pass 50 GHz interleaver.
Figure 16B:
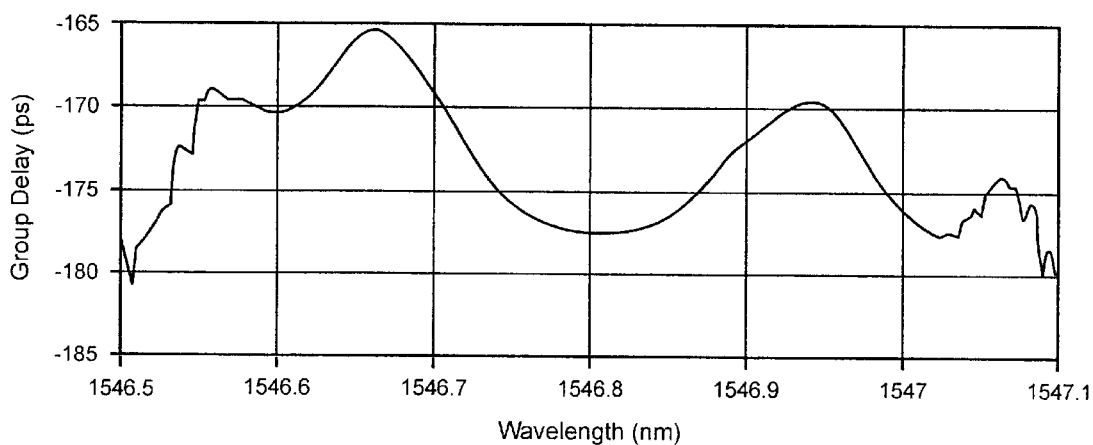
Figure 16C:
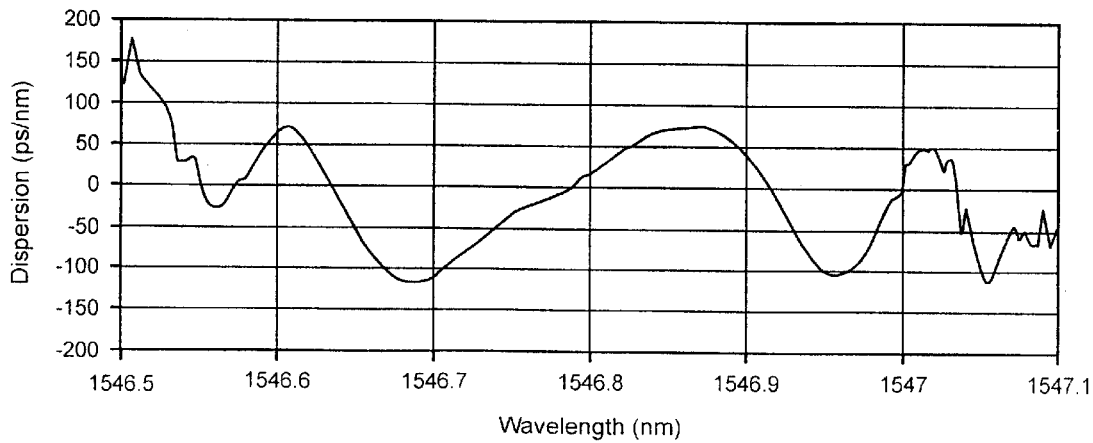

FIGS. 16a, 16b, and 16c are graphs of the loss, group delay and dispersion of a double WDM filter in the form of a double pass 50 GHz interleaver. Compensation is required ±0.1 nm from the channel centre.

Figure 17A:
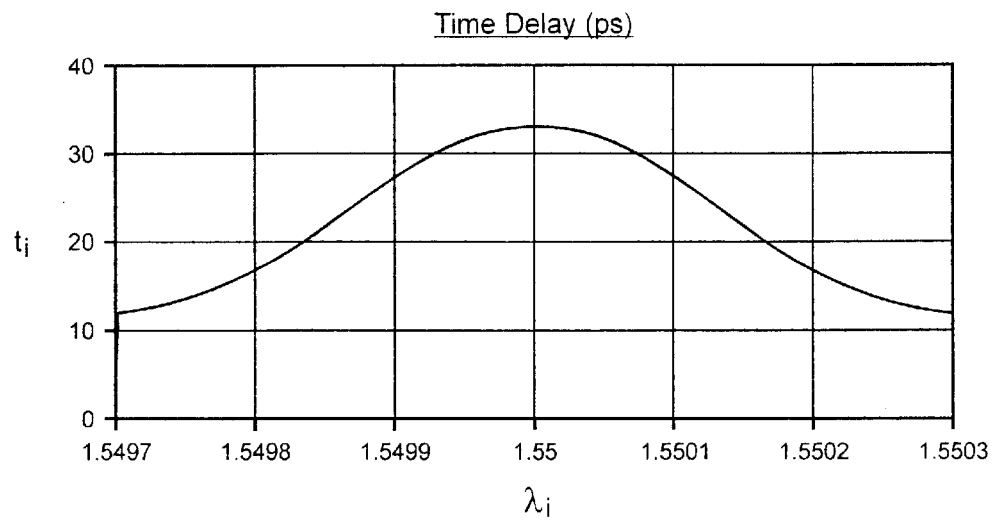
FIGS. 17a and 17b are graphs of time delay and dispersion, respectively, for a dispersion compensator having characteristics that will compensate for the device having characteristics shown if FIGS. 16a through 16c.
Figure 17B:
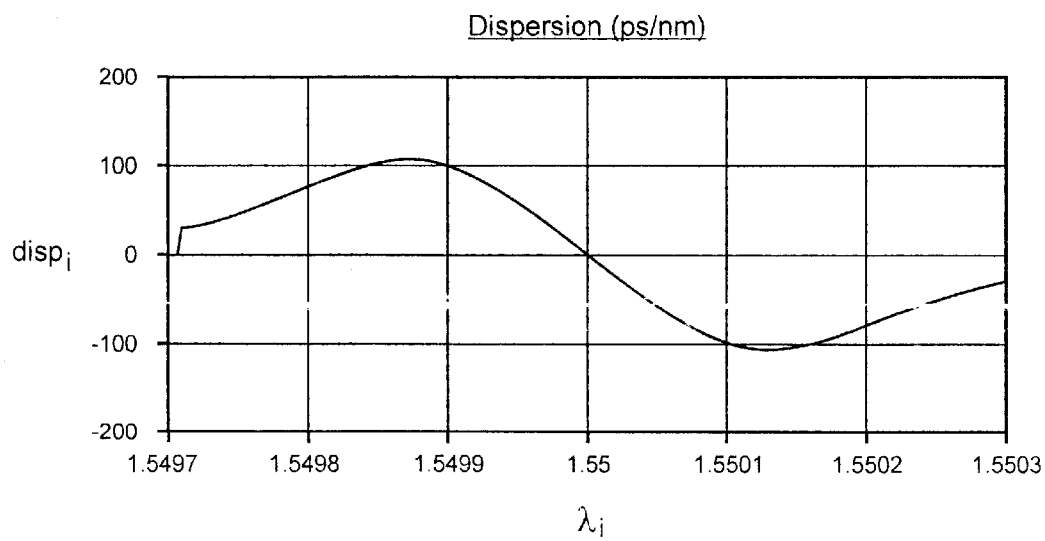

FIGS. 17a and 17b are graphs of time delay and dispersion, respectively, for a 2 cavity reflective dispersion compensator in accordance with the invention with mirror reflectivities 0.8%, 24% and 99.8%. As is shown, dispersion compensation approximately equal to and opposite to the actual device response shown in FIGS. 16a, 16b, and 16c is provided over the passband ±0.1 nm from the channel centre. The device in accordance with this invention is believed to be capable of providing compensation for the dispersion of FIG. 16c at every channel.

There are two surprising aspects to this invention. Firstly, the inventors have discovered that dispersion in a de-interleaved optical signal is periodic and not just linear across the entire band of wavelengths of interest. Secondly, is the discovery, that a GT etalon has a substantially opposite dispersion characteristic that is periodic; by selecting the period to match that of the interleaver, simultaneous compensation over a group of channels or wavelength bands of interest can be realized. Furthermore, by using a multiple cavity device whereon the cavities have the same period or multiples thereof, dispersion compensation and channel width can be controlled.

The advantage of the utilizing the device in accordance with the invention to compensate for a fixed repeated dispersion in for example an output signal received from a multiplexor suffering from periodically repeated dispersion characteristics is evident after viewing FIGS. 2 through 6. However, the invention can provide other unexpected advantages. Dispersion compensators such as dispersion compensating fiber can be used for providing a fixed negative or positive dispersion for optical fibres. However, dispersion compensating fiber cannot compensate for the wavelength dependence of dispersion. If the period in optical frequency of a WDM device (or centre channel wavelength) used in an optical fibre system is slightly different than the period (or centre channel wavelength) of the GT compensator, then at one end of the spectrum the GT compensator will be slightly lower in wavelength than the WDM device, resulting in a flat but negative dispersion, and at the other end of the spectrum the GT compensator will be slightly higher in wavelength than the WDM device, resulting in a flat but positive net dispersion. The GT resonator in accordance with this invention can compensate for (a) WDM dispersion within each channel passband, (b) residual slope of dispersion left over after conventional dispersion compensation techniques have been used by adjusting the period of the GT compensator, and (c) fine-tuning of dispersion level over all channels by adjusting the wavelength of the compensator. Referring once again to FIG. 4, after combining the periodic output response in FIG. 3 indicating periodic dispersion plotted with wavelength, and FIG. 6 which indicates substantially the inverse dispersion slope in accordance with and provided by the invention, the resultant dispersion output response of FIG. 4 is shown. It is noted that this flat line output response occurs due to the slight offset or difference in centre channel wavelength between the WDM device whose output is shown in FIG. 3, and the GT compensator in accordance with this invention. In order to obtain a zero dispersion, the centre channels wavelength should correspond. Notwithstanding, this feature can be used as an advantage of the invention. For example, by varying the optical path length between the etalon end faces of the GT dispersion compensator, the channels' centre wavelengths can be varied to a slightly higher or lower wavelength. This tuning can be done by changing the angle of incidence of the input light, or by providing a change in temperature to the GT device, for example by providing a heating element 200 controlled by processor 201 (FIGS. 13a and 13b) adjacent the etalon to heat the block, or conversely by providing cooling to lessen the optical path length. Thus by providing a temperature tunable GT device that is tunable, dispersion compensation for the WDM device having periodic dispersion is provided while the flat but present dispersion present in the optical fibre within the system can be compensated for by providing a required flat dispersion compensation that is afforded by fine tuning the GT cavity optical path length.

Alternative and preferred embodiments of the invention will now be described in conjunction with FIGS. 19, 20a and 20b, 21a through 21c, 22a and 22b.

Figure 19:
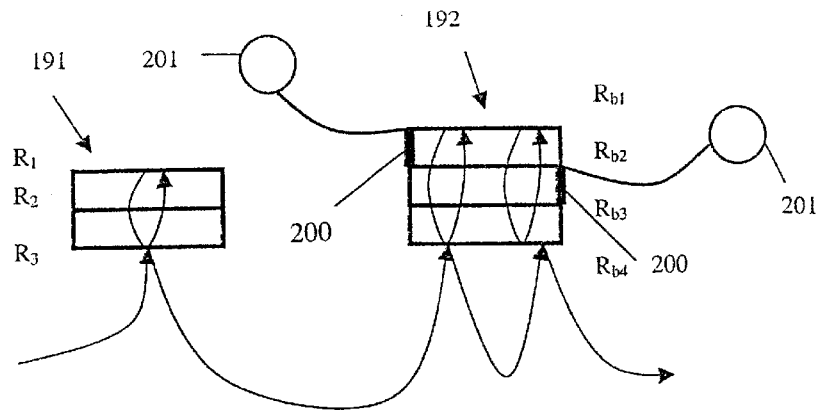
FIG. 19 is a schematic diagram of dispersion compensator in accordance with the invention having a first GT etalon having a first output response optically coupled with a second GT etalon having a different output response wherein the slope is opposite in sign from that of the first GT etalon.
Figure 20A:
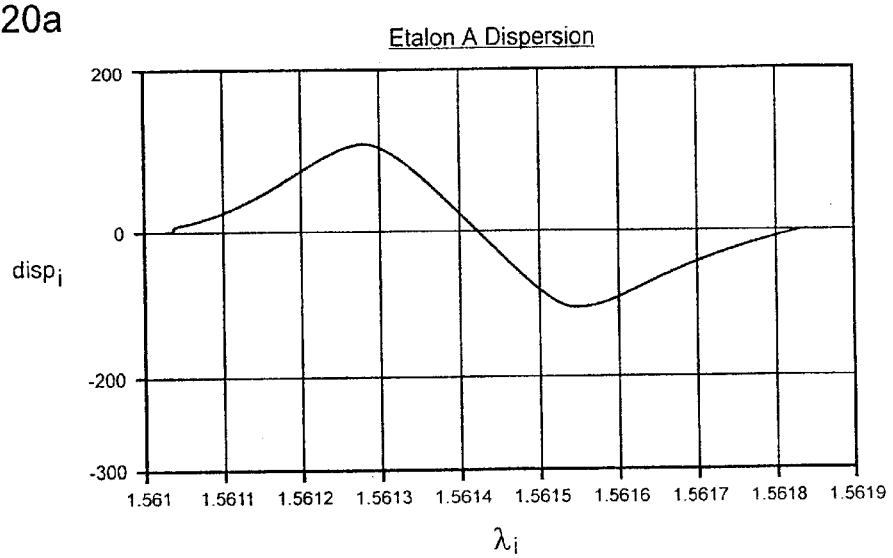
FIG. 20a is a graph of an output response of dispersion versus wavelength for the first GT etalon shown in FIG. 19.
Figure 20B:
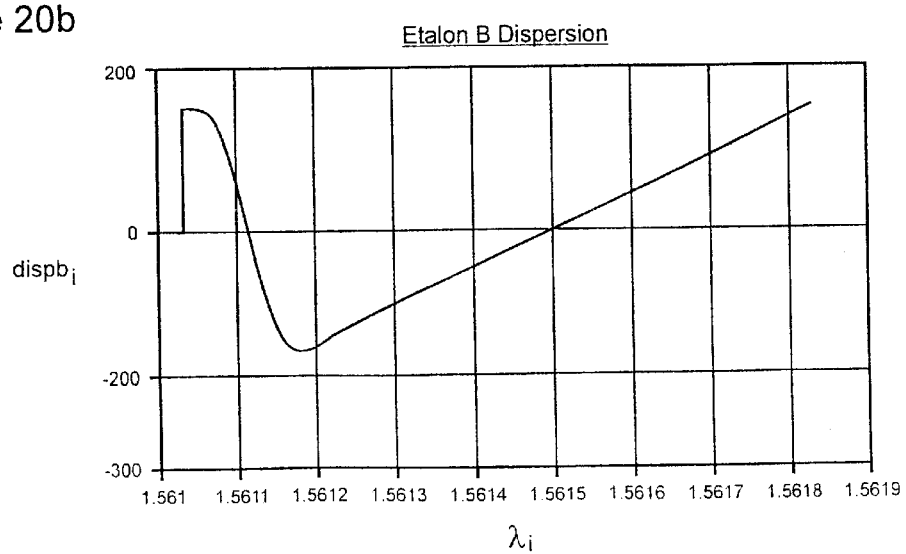
FIG. 20b is a graph of an output response of dispersion versus wavelength for the second GT etalon shown in FIG. 19.
Figure 21A:
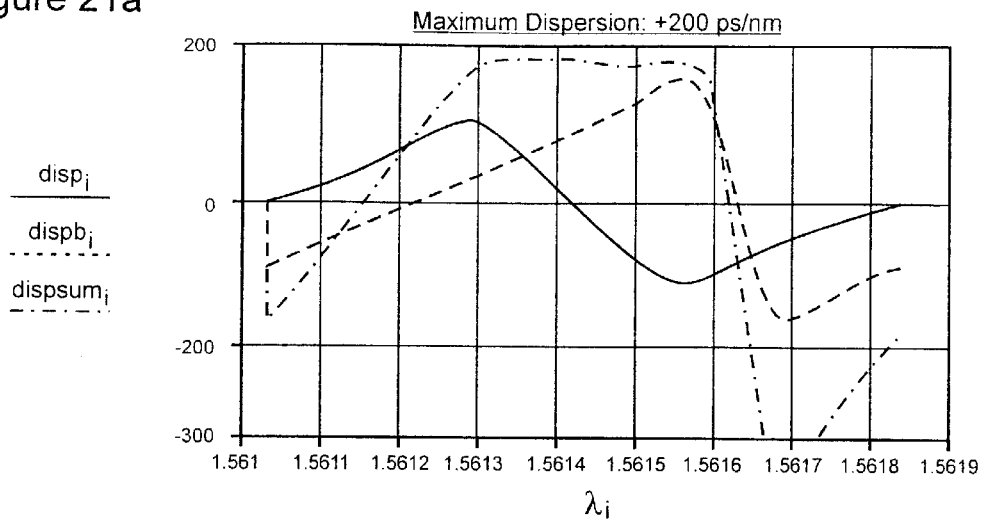
FIGS. 21a through 21c are graphs illustrating the dispersion of the first GT etalon, the second GT etalon and the combined output of the system of etalons after double passing the second GT etalon of FIG. 19 with various levels of control applied; and, FIG. 22 is a block diagram illustrating a dispersion compensator control system in accordance with this invention.
Figure 21B:
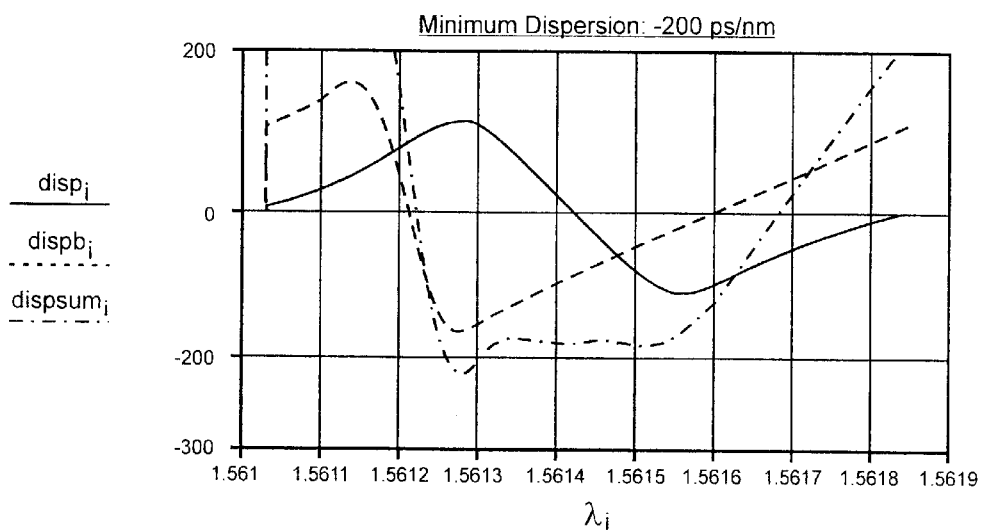
Figure 21C:
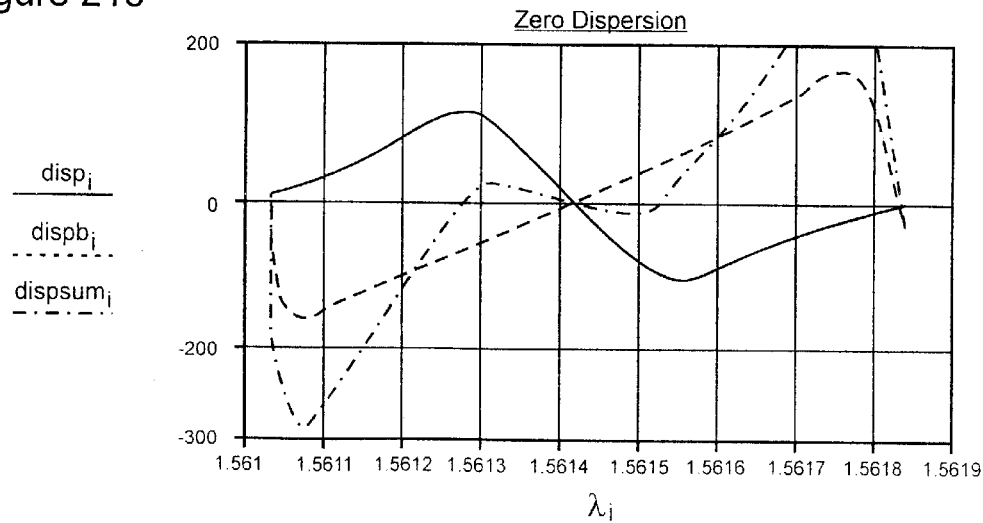

Referring now to FIG. 19 two GT etalons 191 and 192 are shown schematically as being optically coupled to one another. The first etalon 191 is a multi-cavity etalon and the second etalon 192 is a multi-cavity etalon having a greater number of cavities than 191. The etalons are coupled such that a beam launched into etalon 191 propagates within the etalon and after being reflected out of the GT etalon 191 enters the second etalon 192. The beam exiting 192 is then relaunched into etalon 192 a second time. The graphs of FIGS. 20a and 20b show output response curves for dispersion plotted as a function of wavelength for the etalons 191 and 192 respectively. The etalon of FIG. 20a is a two cavity design with mirror reflectivities 0.85%, 24%, and 99.8%, and the etalon of FIG. 20b is a 3 cavity design with mirror reflectivities 0.04%, 2.3%, 38%, and 99.8%. In both cases, all the etalon spacer layers are equal. What is noted in FIG. 20a is that the slope of the dispersion curve between the wavelengths of interest where compensation is required, i.e. 1.5613 $\mu$m and 1.5615 $\mu$m, is that the slope is negative and decreasing. Conversely in FIG. 20b between the same wavelength range, the slope is positive and increasing. The slope shown in the figures of the dispersion wavelength curve is for single pass; however the combined response is twice that shown. If the filters 191 and 192 are selected to produce dispersion response curves that are opposite in sign and have substantially the same magnitude irrespective of sign, i.e. same absolute value at any given wavelength within a range of wavelengths of operation, the combined dispersion output response will be a flat dispersion curve having a substantially zero slope. If one of the etalons produces more dispersion than the other, wherein the dispersion is opposite in sign, the total dispersion from the device comprising the two GT etalons will be monotonically increasing or decreasing. FIGS. 21a through 21c each show three curves wherein the dashed curve indicates the combined response of the other two solid and dotted curves representing output responses of two cascaded dispersion compensating filters, such as the one's shown in FIG. 19. By slightly varying the FSR of one or both of the etalons, its output response can be shifted slightly in wavelength, effectively having the result of relatively moving the dispersion response curves toward or away from each other. This is in effect tuning to provide different amounts of dispersion. As long as the opposite dispersion slopes have an equal magnitude over a range of wavelengths of interest the response will be flat. Since the dispersion is additive between the two responses, the total amount of dispersion at a given wavelength is the sum of the two dispersions induced by the two filters 191 and 192. In FIG. 21a the maximum dispersion is obtained by tuning the etalons and aligning the output responses as shown to obtain a relatively constant dispersion of +200 ps/nm across a wavelength band of interest. FIG. 21b a minimum dispersion of −200 ps/nm is obtained across the same wavelength band of interest. In the embodiment shown, the etalon 192 is temperature tuned using heating elements 200 with controllers 201, and its dispersion output response (curve) is shifted relative to the dispersion output response of the etalon 191. This results in a variable substantially flat dispersion of +/−200 ps/nm that is controllable over a predetermined wavelength band. However etalons of a suitable design must be coupled to one another to obtain a desired output response. Preferably, the FSR of the GT etalons is matched to the ITU grid spacing so that all channels between 192 THz to 196 THz are subjected to the same controllably variable dispersion.

In another embodiment of the invention the etalons 191 and 192 can be provided with a mismatch in FSR thereby providing a device with a dispersion response which varies from channel to channel. For example the dispersion can be varied from 95 ps/nm at 196 THz to −95 ps/nm at 192 THz. This would compensate for the remaining dispersion slope of 150 km of SMF28 optical fibre after dispersion compensation by conventional dispersion compensating fiber.

Figure 22:
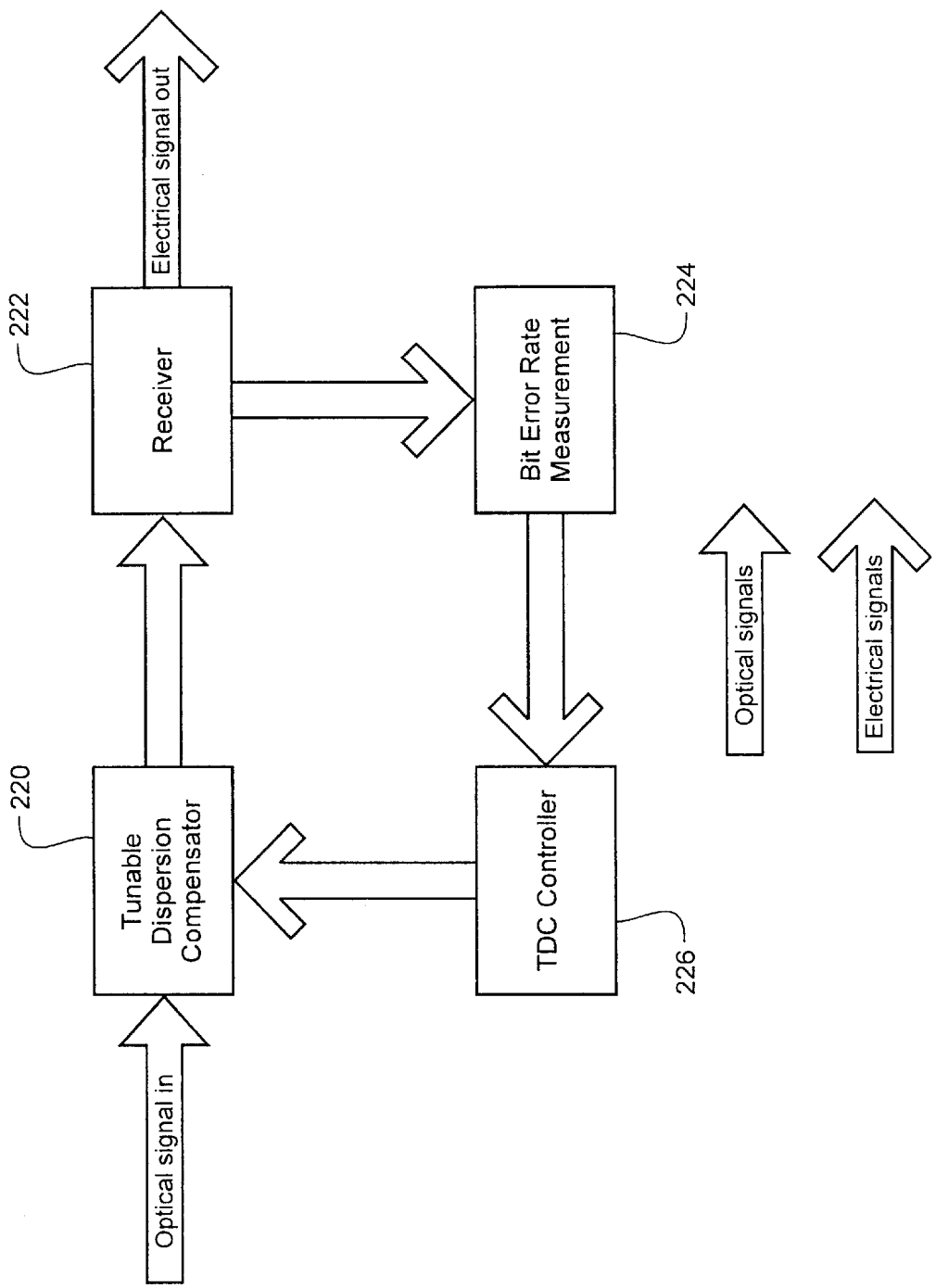

FIG. 22 is a block diagram illustrating a dispersion control system utilizing the tunable dispersion compensator of this invention.

In a typical application, an optical signal travels from a transmitter through a fiber link, to a dispersion compensating fiber, through a demultiplexer, and is directed to the tunable dispersion compensator 220. Prior to entering the tunable dispersion compensation block 220 the optical signal requires dispersion compensation. The signal passes through the tunable dispersion compensator 220 and continues to the receiver 222 where it is converted to an electrical signal. This electrical signal continues through the network (as useful communication signal), and also goes to a bit error rate tester 224 (or other method of testing the quality of the signal, such as eye diagram measurement). The bit error rate tester provides a feedback signal to the tunable dispersion compensator controller 226. The TDC controller 226 subsequently determines whether adjustments to the dispersion are required, or whether a previous adjustment has improved or degraded the signal.

This invention provides a compensator that is tunable to a plurality of different, constant dispersion values over a wavelength band of interest; or alternatively, which provides monotonically increasing or decreasing dispersion values that can be increased or decreased in tandem over a wavelength band of interest.

What is claimed is:

1. A dispersion compensation device for compensating dispersion in an optical signal in at least a predetermined wavelength band of wavelengths, comprising:
   a first GT resonator having a first FSR and a single sloped dispersion curve in the predetermined wavelength band;
   a second GT resonator having a single sloped dispersion curve in the predetermined wavelength band, the slope of the dispersion curve of the second GT resonator is opposite in sign to the slope of the dispersion curve of the first GT resonator in said wavelength band, the second GT resonator being optically coupled with the first GT resonator such that light launched into the first GT resonator is directed to the second GT resonator, at least one of the first GT resonator and the second GT resonator being a tunable resonator such that the FSR thereof is controllably variable; and,
   a controller for controlling the FSR of each tunable resonator and for controlling the amount of dispersion within the wavelength band.

2. A dispersion compensation device as defined in claim 1, wherein the optical signal launched into the first and subsequently the second GT resonator is reflected from at least one of said GT resonators at least twice.

3. A dispersion compensation device as defined in claim 1, for simultaneously compensating for dispersion present within individual channels in a multi-channel optical system having a multi-channel signal, which has a predetermined channel spacing between adjacent channels, wherein at least one of the first and second GT resonators has an FSR that is substantially equal to or that is an integer multiple of the channel spacing of the multi-channel optical system or wherein the channel spacing of the multi-channel optical system is an integer multiple of the FSR of at least one of said GT resonators.

4. A dispersion compensation device as defined in claim 1, wherein at least one of the first and second GT resonators includes multiple optical cavities.

5. A dispersion compensation device as defined in claim 4, wherein the dispersion of the first and second GT resonators is for providing a combined dispersion that is increasing generally linearly, decreasing generally linearly, and substantially constant within the predetermined wavelength band.

6. The dispersion compensation device as defined in claim 1, wherein the second GT resonator has a second FSR, which is different than the first FSR.

7. A dispersion compensation device for compensating dispersion in an optical signal having at least a component corresponding to an optical channel, comprising:
   a first optical filter having a monotonically increasing or decreasing sloped dispersion output response to light within at least a predetermined wavelength band; and
   a second optical filter having a monotonically oppositely sloped dispersion output response to light within a same predetermined wavelength band, the second optical filter being optically coupled with the first optical such that light launched into the first filter is directed to the second filter, at least one of the first optical filter and the second optical filter being a tunable filter to vary the dispersion thereof over the predetermined wavelength band, such that the dispersion of the device can be controllably varied.

8. A dispersion compensation device as defined in claim 7, wherein each tunable filter is a GT resonator.

9. A dispersion compensation device as defined in claim 8, wherein at least one of the GT resonators has a tunable FSR.

10. A dispersion compensation device as defined in claim 8, wherein the first and second filters are first and second GT resonators, respectively.

11. A dispersion compensation device as defined in claim 10, wherein at least one of the first and second GT resonators is a multi-cavity GT etalon.

12. A dispersion compensation device as defined in claim 10, wherein the first and second GT resonators are configured such that an optical signal launched into the device is reflected from at least one of the GT resonators more than once.

13. A dispersion compensation device as defined in claim 7, wherein the first or second filter is tuned, whereby dispersion of the device over the predetermined wavelength band is substantially constant.

14. A dispersion compensation device as defined in claim 13, wherein the first or second filter is tuned, whereby dispersion of the device over the predetermined wavelength band and within a tuning range of each tunable filter is substantially constant.

15. The dispersion compensation device as defined in claim 7, further comprising a processor controlled means for tuning each tunable filter to vary the amount of dispersion exhibited by the device within at least a predetermined channel.

16. A method for compensating dispersion in an optical signal having at least a predetermined wavelength band, comprising:
   providing a first optical filter having a monotonically sloped dispersion output response within at least the predetermined wavelength band;
   providing a second optical filter having a monotonically sloped dispersion output response within at least the predetermined wavelength band, wherein the first and second filters have slopes of opposite sign;
   tuning the first filter in a controllable manner to vary the amount of dispersion induced thereby upon the optical signal within the predetermined wavelength band.

17. A method as defined in claim 16, wherein the first filter is a GT resonator having a first FSR.

18. A method as defined in claim 17, wherein the GT resonator is tunable by varying the optical path length thereof.

19. A method of simultaneously providing dispersion compensation for offsetting group delay within a plurality of channels in a multi-channel optical signal having predetermined channel spacing between adjacent channels, comprising the steps of:

provicing the multi-channel optical signal requiring dispersion compensation of individual channels within the optical signal;

launching the optical signal into two different periodic devices having a substantially unchanging amplitude output response with respect of the wavelength of the optical signal, the periodic devices having output responses which vary periodically in phase with respect to wavelength of the optical signal, the periodically varying phase having a correspondence with the channel spacing; and, receiving a phase compensated output signal having its phase adjusted by the periodic device in a periodic manner which has a correspondence to the channel spacing.

* * * * *